United States Patent
Tuohino

(10) Patent No.: US 6,959,057 B1
(45) Date of Patent: Oct. 25, 2005

(54) METHOD OF ENHANCING SIGNAL TRACKING IN GLOBAL POSITIONING SYSTEM RECEIVERS

(75) Inventor: Jeffrey L. Tuohino, Cedar Rapids, IA (US)

(73) Assignee: Rockwell Collins, Cedar Rapids, IA (US)

(*) Notice: Subject to any disclaimer, the term of this patent is extended or adjusted under 35 U.S.C. 154(b) by 873 days.

(21) Appl. No.: 09/844,412

(22) Filed: Apr. 27, 2001

(51) Int. Cl.$^7$ ............................................. H04L 7/00
(52) U.S. Cl. ................ 375/354; 375/325; 375/343; 341/352; 701/213
(58) Field of Search ................................ 375/354, 343, 375/325; 701/213; 342/357; 341/352

(56) References Cited

U.S. PATENT DOCUMENTS

| | | | |
|---|---|---|---|
| 5,878,089 A * | 3/1999 | Dapper et al. ............... | 375/325 |
| 6,437,734 B1 * | 8/2002 | McBurney et al. ..... | 342/357.09 |
| 6,683,923 B1 * | 1/2004 | Butts, Jr. ................... | 375/343 |
| 6,725,157 B1 * | 4/2004 | Yu .............................. | 701/213 |

OTHER PUBLICATIONS

Vittorini et al; Optimizing Indoor GPS Performance; Nov 1, 2003, 6pages.*

* cited by examiner

*Primary Examiner*—Shuwang Liu
*Assistant Examiner*—Eva Zheng
(74) *Attorney, Agent, or Firm*—Nathan O. Jensen; Kyle Eppele

(57) ABSTRACT

A method of enhancing signal tracking in a global positioning system receiver utilizing a frequency banked filter in providing code and carrier tracking loops includes acquiring a continuous time global positioning signal and separating the continuous time global positioning signal into in-phase and quadrature signals I and Q. The signals I and Q are sampled over a predetection interval (PDI) to provide discrete time signals, and the discrete time signals are used to generate a component in-phase measurement and a component quadrature measurement for each of multiple PDI segments of one PDI. For each of multiple different frequency bins, composite in-phase and quadrature measurements are generated by combining component in-phase measurements and component quadrature measurements from the PDI. Power is detected in each of the multiple different frequency bins for the PDI using the corresponding composite in-phase measurement and the corresponding composite quadrature measurement generated for the frequency bin.

20 Claims, 8 Drawing Sheets

TABLE 1
CODE TRACKING USING FIVE FREQUENCY BINS AND FIVE PDI SEGMENTS

| BIN | $f_O$ Hz | X (I) | Y (Q) |
|---|---|---|---|
| -2 | -60 | $I_1-Q_2-I_3+Q_4+I_5$ | $Q_1+I_2-Q_3-I_4+Q_5$ |
| -1 | -30 | $I_1+I_2-Q_3-Q_4-I_5$ | $Q_1+Q_2+I_3+I_4-Q_5$ |
| 0 | 0 | $I_1+I_2+I_3+I_4+I_5$ | $Q_1+Q_2+Q_3+Q_4+Q_5$ |
| 1 | +30 | $I_1+I_2+Q_3+Q_4-I_5$ | $Q_1+Q_2-I_3-I_4-Q_5$ |
| 2 | +60 | $I_1+Q_2-I_3-Q_4+I_5$ | $Q_1-I_2-Q_3+I_4+Q_5$ |

FIG. 3

METHOD OF ENHANCING SIGNAL TRACKING IN GLOBAL POSITIONING SYSTEM RECEIVERS

CROSS-REFERENCE TO RELATED APPLICATIONS

Reference is made to co-pending and commonly assigned patent application Ser. No. 08/963,930, filed on Nov. 4, 1998, and entitled "MULTIPLE FREQUENCY BIN PROCESSING", which is herein incorporated by reference in it entirety.

FIELD OF THE INVENTION

The present invention relates generally to global positioning system (GPS) receivers. More particularly, the present invention relates to methods for enhancing signal tracking in GPS receivers.

BACKGROUND OF THE INVENTION

Global navigational satellite systems (GNSS) are known and include the global positioning system (GPS) and the Russian global orbiting navigational satellite system (GLONASS). GNSS-based navigational systems are used for navigation and positioning applications. In the GPS navigational system, GPS receivers receive satellite positioning signals from a set of up to 32 satellites deployed in 12-hour orbits about earth and dispersed in six orbital planes at an altitude of 10,900 nautical miles. Each GPS satellite continuously transmits two spread spectrum, L-band signals: an L1 signal having a frequency $f_{L1}$ of 1575.42 MHz, and an L2 signal having a frequency $f_{L2}$ of 1227.6 MHz. The L1 signal from each satellite is modulated by two pseudo-random codes, the coarse acquisition (C/A) code and the P-code. The P-code is normally encrypted, with the encrypted version of the P-code referred to as the Y-code. The L2 signal from each satellite is modulated by the Y-code. The C/A code is available for non-military uses, while the P-code (Y-code) is reserved for military uses.

GPS navigational systems determine positions by timing how long it takes the coded radio GPS signal to reach the receiver from a particular satellite (e.g., the travel time). The receiver generates a set of codes identical to those codes (e.g., the Y-code or the C/A-code) transmitted by the satellites. To calculate the travel time, the receiver determines how far it has to shift its own codes to match the codes transmitted by the satellites. The determined travel times for each satellite are multiplied by the speed of light to determine the distances from the satellites to the receiver. By receiving GPS signals from four or more satellites, a receiver unit can accurately determine its position in three dimensions (e.g., longitude, latitude, and altitude). Receivers typically utilize the fourth satellite to accommodate a timing offset between the clocks in the receiver and the clocks in the satellites. Additional satellite measurements can be used to improve the position solution.

Conventional GPS receivers integrate the baseband quadrature components (I and Q) of the satellite signals, implement a power detection function, and then follow this with post detection summation. If the frequency error is large, acquisition of the signal is more difficult because of the effective bandwidth of the coherent integration process. One solution to this problem has been to shorten the sampling interval and to implement a banked filter process such as a Fast Fourier transform (FFT). Multiple outputs from the FFT can then be detected and summed in post detection filters. However, the FFT method has several disadvantages. For example, if the signal frequency falls between FFT frequency bins, it will be significantly attenuated. Also, if the signal frequency is near the outer edges of the FFT response, it will be attenuated by the integration process prior to sampling. Further, the FFT requires multiplication if more than four points are used. Further still, utilization of an FFT typically produces frequency bins with frequencies up to plus and minus one-half the interval between samples, thereby causing the frequency bins on the extremes of the pattern to be non-useful because of the attenuation caused by integration over the segment.

Co-pending and commonly assigned patent application Ser. No. 08/963,930, filed on Nov. 4, 1998, entitled "MULTIPLE FREQUENCY BIN PROCESSING" teaches a method for increasing signal acquisition in GPS receivers which overcomes many of the disadvantages of FFT described above. As taught in this co-pending application, an algorithm for a banked filter provides low attenuation between frequency bins. Using the technique described in this application, all of the frequency bins produce useful results and no multiplications are required to implement the algorithms. A shortened sampling interval is utilized in the banked filter process, with the multiple outputs of the banked filter being detected and summed in post detection filters. The invention as taught in this co-pending application provides enhanced signal acquisition.

Once the signal is acquired by the GPS receiver, the signal can be tracked using local versions of the GPS signal code and carrier. However, as the signal begins to degrade, the receiver can lose the ability to track the carrier, and the receiver enters a mode of operation known as "State 3" operation. State 3 is a standard GPS mode of operation where the signal has degraded to the point where the receiver cannot track the carrier itself, but can track the code if an adequate frequency reference is available. Typically, the frequency reference comes from an inertial navigation system (INS), for example in the form of velocity information from the INS. So long as the receiver is close to being on frequency, the code portion of the GPS signals can still be tracked with the aid of the frequency reference.

Extended Range Correlation (ERC) is a mode of operation similar to the State 3 mode of operation. However, in the ERC mode of operation, the receiver will typically integrate the signal for multiple seconds, as opposed to integration for one second as is common in State 3 operation. The ERC mode of operation is an attempt by the receiver to filter out additional noise in order to track the signal for as long as possible. In the State 3 and ERC modes, as the INS output or other frequency reference information begins to degrade, the quadrature components I and Q of the satellite signals become more difficult to track. An improved method of tracking the GPS signal after acquisition and during these modes of operation would be a substantial improvement in the art.

SUMMARY OF THE INVENTION

A method of enhancing signal tracking in a global positioning system receiver utilizing a frequency banked filter in providing code and carrier tracking loops includes acquiring a continuous time global positioning signal and separating the continuous time global positioning signal into in-phase and quadrature signals I and Q. The signals I and Q are sampled over a predetection interval (PDI) to provide discrete time signals, and the discrete time signals are used to generate a component in-phase measurement and a component quadrature measurement for each of multiple PDI segments of one PDI. For each of multiple different frequency bins, a composite in-phase measurement is generated by combining component in-phase measurements and component quadrature measurements from the PDI. Similarly, for each of the multiple frequency bins, a composite quadrature measurement is generated by combining component in-phase measurements and component quadrature measurements from the PDI. Power is detected in each of the multiple different frequency bins for the PDI using the corresponding composite in-phase measurement and the corresponding composite quadrature measurement generated for the frequency bin.

BRIEF DESCRIPTION OF THE DRAWINGS

FIG. 3 is a table which illustrates algorithms for code tracking using five frequency bins and five pre-detection interval segments.

DETAILED DESCRIPTION OF AN ILLUSTRATIVE EMBODIMENT

Figure 1:
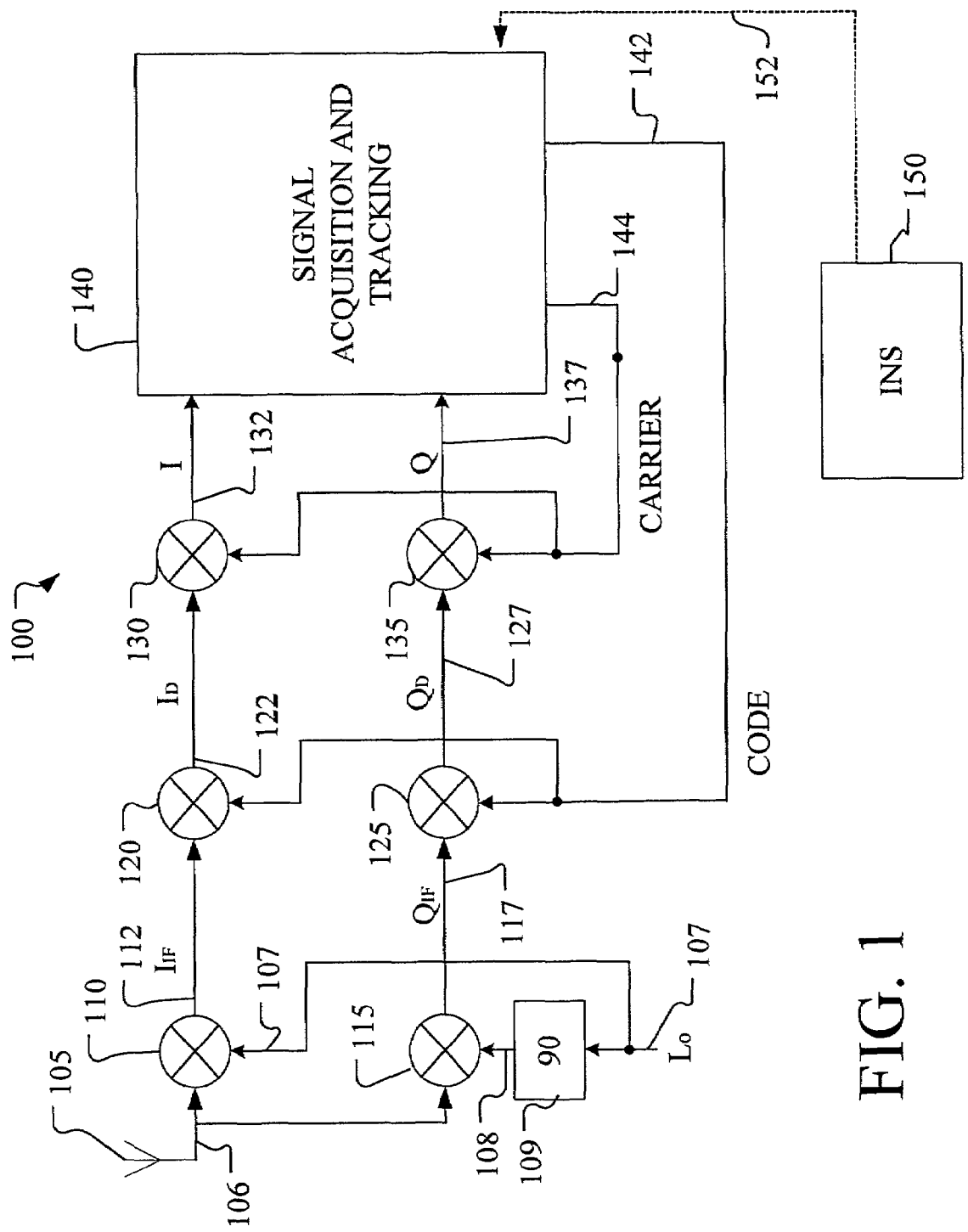
FIG. 1 is a diagrammatic illustration of a GPS receiver adapted to implement improved signal tracking algorithms in accordance with the invention.

FIG. 1 is a diagrammatic illustration of portions of GPS receiver 100 in accordance with embodiments of the present invention. FIG. 1 illustrates both general and conventional signal processing stages implemented in conventional GPS receivers, and signal tracking functions implemented in accordance with the present invention. The illustration of both the conventional signal processing stages and of the signal tracking stage is diagrammatic and is not intended to limit the invention to a particular embodiment. For example, the signal frequency down-conversion, code de-spreading, and carrier de-spreading stages illustrated in FIG. 1 can be implemented in a different order or can be combined into fewer stages. Further, aspects of the invention illustrated in functional steps or stages are representative of the corresponding circuitry, including suitably programmed processors or other controllers or components. Thus, the following discussion is intended to teach the concepts of the present invention, but should not be interpreted so as to limit the invention to the specific embodiments illustrated.

GPS receiver 100 includes antenna 105, radio frequency (RF) down-conversion mixers 110 and 115, code spreading mixers 120 and 125, intermediate frequency (IF) down-conversion mixers 130 and 135, and signal acquisition and tracking circuitry 140. Antenna 105 receives GPS positioning signals from multiple GPS satellites (not shown) and provides at output 106 electrical versions of these signals. Mixer 110 mixes the received GPS signals with a frequency reference signal $L_O$ provided at input 107 to generate at output 112 an in-phase component signal $I_{IF}$ at an intermediate frequency. Frequency reference signal $L_O$ is phase shifted at block 109 to provide at output 108 a signal which is 90° out of phase with the frequency reference signal. This out of phase version of the frequency reference signal $L_O$ is mixed by mixer 115 with the GPS signal to produce a quadrature component signal $Q_{IF}$ at output 117, as is known in the art.

In-phase and quadrature component signals $I_{IF}$ and $Q_{IF}$ are mixed using mixers 120 and 125 with a local version of the GPS code provided at output 142 of signal acquisition and tracking circuitry 140. Mixers 120 and 125 provide, at respective outputs 122 and 127, code de-spread in-phase and quadrature signals $I_D$ and $Q_D$. Mixers 130 and 135 mix the code de-spread signals $I_D$ and $Q_D$ with a local version of the IF carrier provided at output 144 of signal acquisition and tracking circuitry 140. As an output, mixers 130 and 135 provide baseband in-phase and quadrature component signals I and Q at outputs 132 and 137, as is known in the art. As discussed above, it must be noted that the various steps in obtaining in-phase and quadrature signals I and Q can be performed in differing orders if desired. Further, one or more of these frequency conversion steps can be combined or omitted in some embodiments.

Signal acquisition and tracking circuitry 140 can be one or more suitably programmed micro-processors, digital signal processors, or other integrated circuits adapted to implement methods of the present invention as described below. In some embodiments, signal acquisition and tracking circuitry 140 implements signal acquisition processing techniques as described in co-pending and commonly assigned application Ser. No. 08/963,930, filed on Nov. 4, 1997 and entitled "MULTIPLE FREQUENCY BIN PROCESSING." After signal acquisition, circuitry 140 also implements methods of the present invention of tracking the GPS signal during State 3 or ERC modes of operation (or similar modes of operation) in which the carrier signal is lost and in which the frequency reference information 152 from INS 150 (or other sources of frequency reference information) is degrading.

Figure 2:
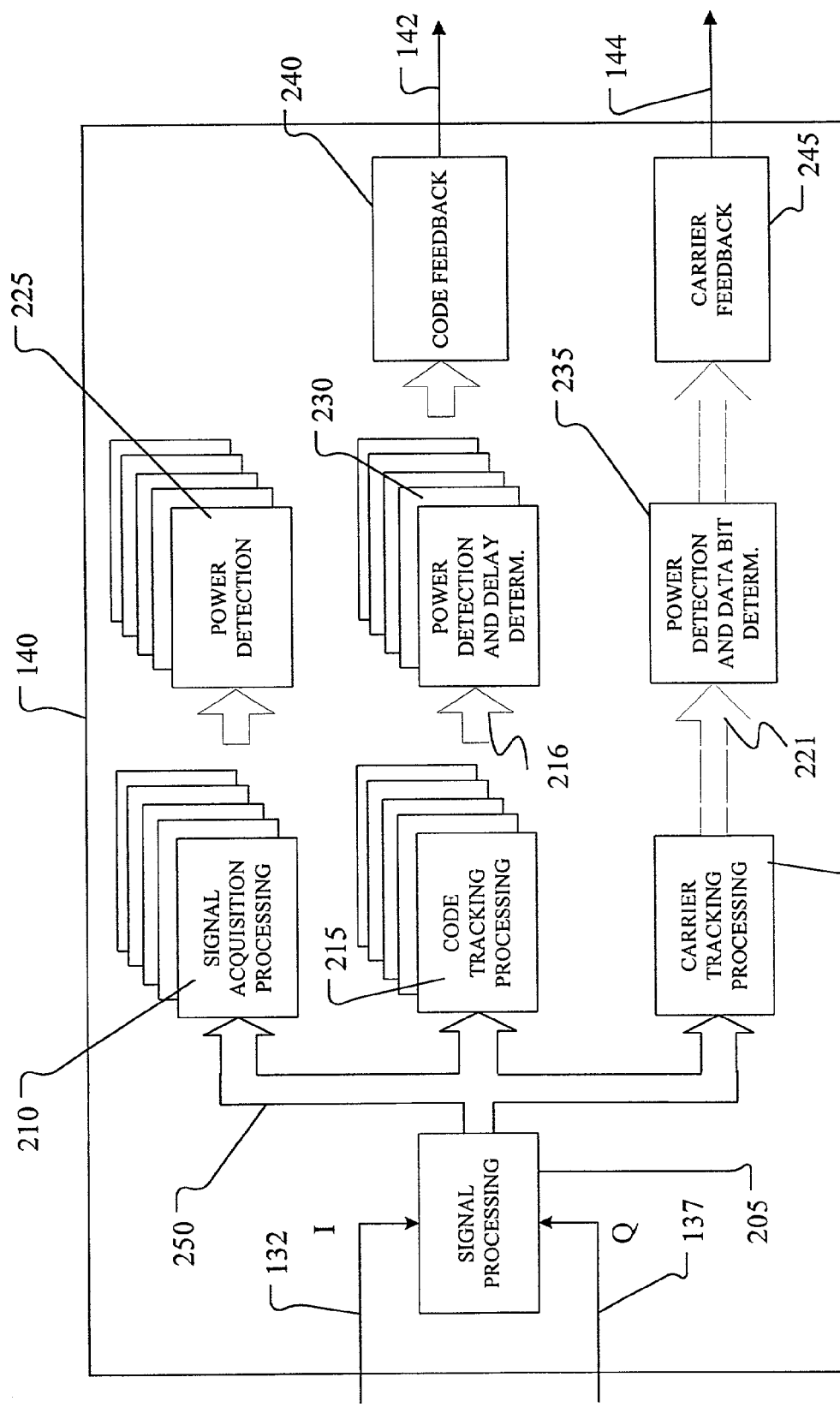
FIG. 2 is a diagrammatic illustration of portions of the receiver shown in FIG. 1 illustrating code and carrier tracking functions in greater detail.

FIG. 2 is a block diagram illustrating portions of signal acquisition and tracking circuitry 140 in greater detail. Circuitry 140 includes signal processing circuitry 205, signal acquisition processing circuitry 210, code tracking processing circuitry 215, carrier tracking processing circuitry 220, power detection circuitry 225, power detection and delay determination circuitry 230, power detection and data bit determination circuitry 235, code feedback generating circuitry 240, and carrier feedback generating circuitry 245. Signal processing circuitry 205 receives the in-phase and quadrature component signals I and Q and samples these continuous-time signals at a reduced sampling interval to produce discrete time signals. The discrete time signals are then processed with a banked filter to produce at output 250 multiple signal outputs which are used to generate multiple frequency bins as is discussed below in greater detail. The multiple frequency bins outputs are then used for signal acquisition processing as disclosed in the co-pending and commonly assigned patent application Ser. No. 08/963,930, entitled "MULTIPLE FREQUENCY BIN PROCESSING" implemented within signal acquisition processing circuitry 210 and power detection circuitry 225. In accordance with the present invention, the multiple signal outputs 250 used in the multiple frequency bins are also used by code tracking processing circuitry 215 and power detection and data bit determination circuitry 230 to maintain a track on the code portion of the GPS signals, and optionally by carrier tracking processing circuitry 220 and power detection and delay determination circuitry 235 to maintain a track on the carrier portion of the GPS signals.

While tracking a GPS signal, a predetection interval (PDI) of approximately 20 milliseconds is used. In contrast, during signal acquisition (circuitry 210 and 225) a PDI of approximately 1 millisecond is used. In an embodiment of the invention, the 20 millisecond tracking PDI is divided into five PDI segments, each having a duration of 4 milliseconds. In the present invention, signal processing circuitry 205 subdivides the in-phase and quadrature signals I and Q into segments or segmented measurements. For example, if the 20 millisecond PDI is divided into five segments, then signal processing circuitry 205 will provide at output 250 five component in-phase measurements $I_1$, $I_2$, $I_3$, $I_4$ and $I_5$, as well as five component quadrature measurements $Q_1$, $Q_2$, $Q_3$, $Q_4$ and $Q_5$ during the PDI.

Code tracking processing circuitry 215 utilizes the multiple in-phase component measurements and the multiple quadrature measurements provided at output 250 to produce at output 216 an in-phase value X and a quadrature value Y for each of the multiple frequency bins. FIG. 3 is a table illustrating details of an embodiment of the invention in which five frequency bins (numbered −2, −1, 0, 1 and 2) are utilized. It must be noted that the number of frequency bins and the number of PDI segments can be varied as desired. Also, the number of frequency bins need not necessarily be the same as the number of PDI segments. Further, the invention is not limited to the specific combinations quadrature measurements shown in Table 1. Other combinations can be used as well.

In Table 1, center frequency $f_O$ represents an estimated error in the carrier frequency for each of the frequency bins (−2, −1, 0, 1 and 2). Also as shown in Table 1, the in-phase composite value X and the quadrature composite value Y are determined for each frequency bin by code tracking processing circuitry 215 by summing various combinations of the in-phase and quadrature segmented signals. Code tracking processing circuitry 215 outputs a different in-phase value X and a different quadrature value Y for each frequency bin at outputs 216 and 221. The multiple boxes shown for circuitry 215 are indicative of the processing for each of the multiple frequency bins.

During modes of operation in which an accurate frequency reference is no longer available, the carrier I-Q phaser begins to spin. Generally, GPS receivers detect this and attempt to null out movement of the I-Q phaser. However, as the signal weakens, it becomes difficult to predict this movement, and integration of the signal can result in a value which approaches zero. By utilizing combinations of in-phase and quadrature components in the determination of the in-phase values X and the quadrature values Y for each frequency bin over the various time segments, integration of the GPS signal is less likely to approach zero. Thus, even with the Doppler error causing the I-Q phaser to spin, power in the signal is more likely to be measured by power detection circuitry 230 (and by circuitry 235), thus allowing the code and/or carrier signals to be adjusted in such a way that will extend the tracking of the signal.

Power detection and delay determination circuitry 230 is circuitry which is used to analyze the in-phase value X and the quadrature value Y for each frequency bin. Although shown together as a single block, the power detection circuitry will typically be distinct from the delay determination circuitry. The power detection functions feed the delay determination functions information indicative of which frequency bin contains the most signal power. The multiple boxes of circuitry 230 are indicative of the fact that these functions are performed for each of the frequency bins. The delay determination circuitry feeds code feedback circuitry 240, which in turn provides the feedback signal 142.

Figure 4:
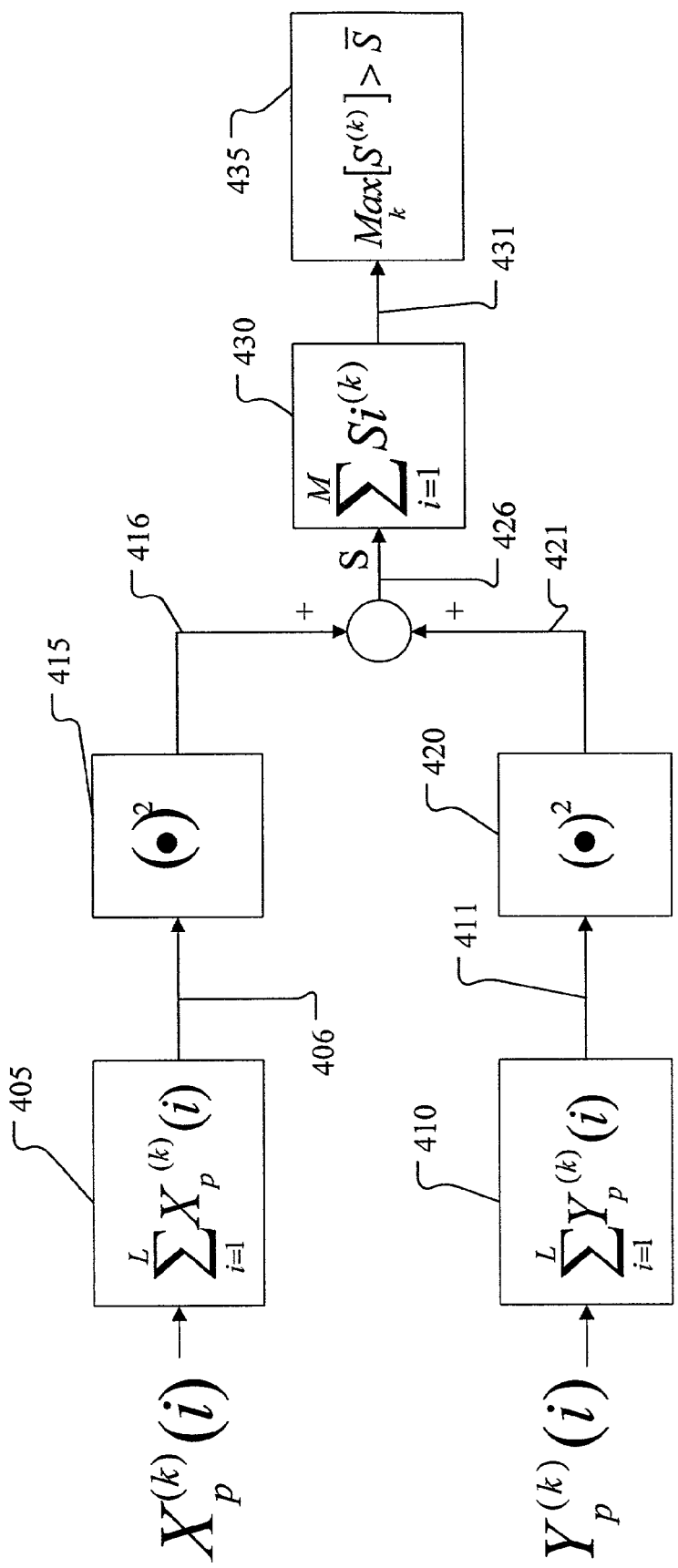
FIG. 4 is a block diagram illustrating one embodiment of a power detector which can be used to detect power in a frequency bin.

FIG. 4 is a block diagram illustrating a power detector which can be implemented within circuitry 230. For each of the frequency bins (in this example frequency bins k=−2, −1, 0, 1, 2 are used) each of L subsamples of the composite in-phase value X and the quadrature value Y are summed at summation blocks 405 and 410 to produce composite in-phase and quadrature values X and Y at respective outputs 406 and 411. Each of these composite values is then squared at multiplication blocks 415 and 420 to produce $X^2$ output 416 and $Y^2$ output 421. These values are then added at summation node 425 to produce signal S at output 426. A number M of the values S are summed at summation block 430 to produce a signal $S^{(k)}$ for each frequency bin at output 431. Then, at block 435, a determination is made as to whether the maximum value of signal $S^{(k)}$ for the $k^{th}$ frequency bin exceeds a threshold value $\overline{S}$.

Figure 5:
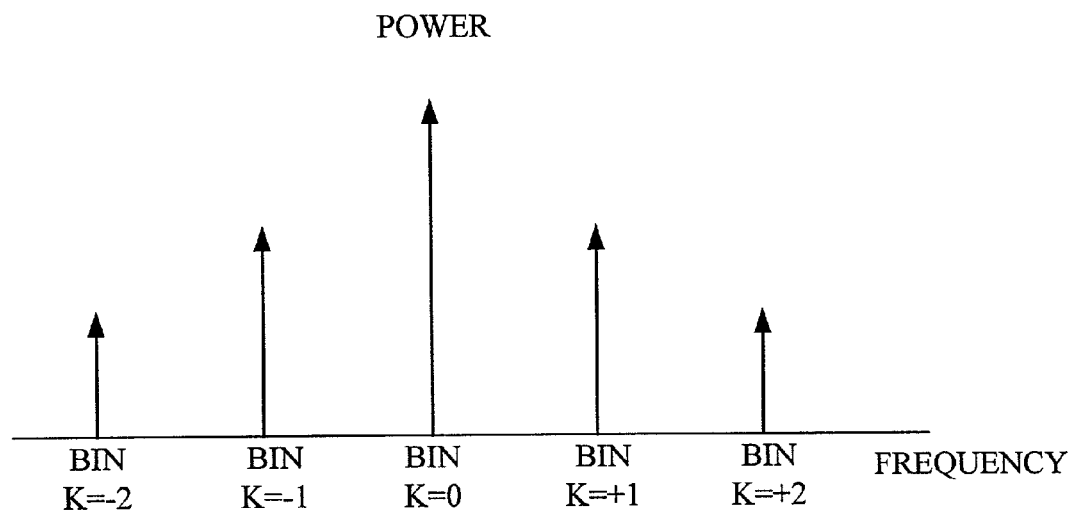
FIG. 5 is a diagrammatic illustration representative of power detected in each of five frequency bins in an example of operation of the present invention.

Referring back to FIG. 2, applying a power detection function (for example $X^2+Y^2$) to the in-phase X(I) and quadrature Y(Q) composite values (outputs 216) for each of the frequency bins, five values of detected power are produced by circuitry 230. An example of this is shown in FIG. 5 in which frequency bin K=0 is shown to have the highest detected power. With the knowledge of which frequency bin possesses the most power, it can be determined how far the phase of the local version of the code is off set from the phase of the code of the incoming GPS signal. This can be done for example using a delay detector function such as the one described below in Equation 1 and illustrated in FIG. 6.

$$D^{(k)} \sim \frac{\left(\begin{bmatrix} X_e^{(k)} \\ Y_e^{(k)} \end{bmatrix} - \begin{bmatrix} X_l^{(k)} \\ Y_l^{(k)} \end{bmatrix}\right) \cdot \begin{bmatrix} X_p^{(k)} \\ Y_p^{(k)} \end{bmatrix}}{\begin{bmatrix} X_p^{(k)} \\ Y_p^{(k)} \end{bmatrix} \cdot \begin{bmatrix} X_p^{(k)} \\ Y_p^{(k)} \end{bmatrix}} \quad \text{where} \quad \text{Eq. 1}$$

Figure 6:
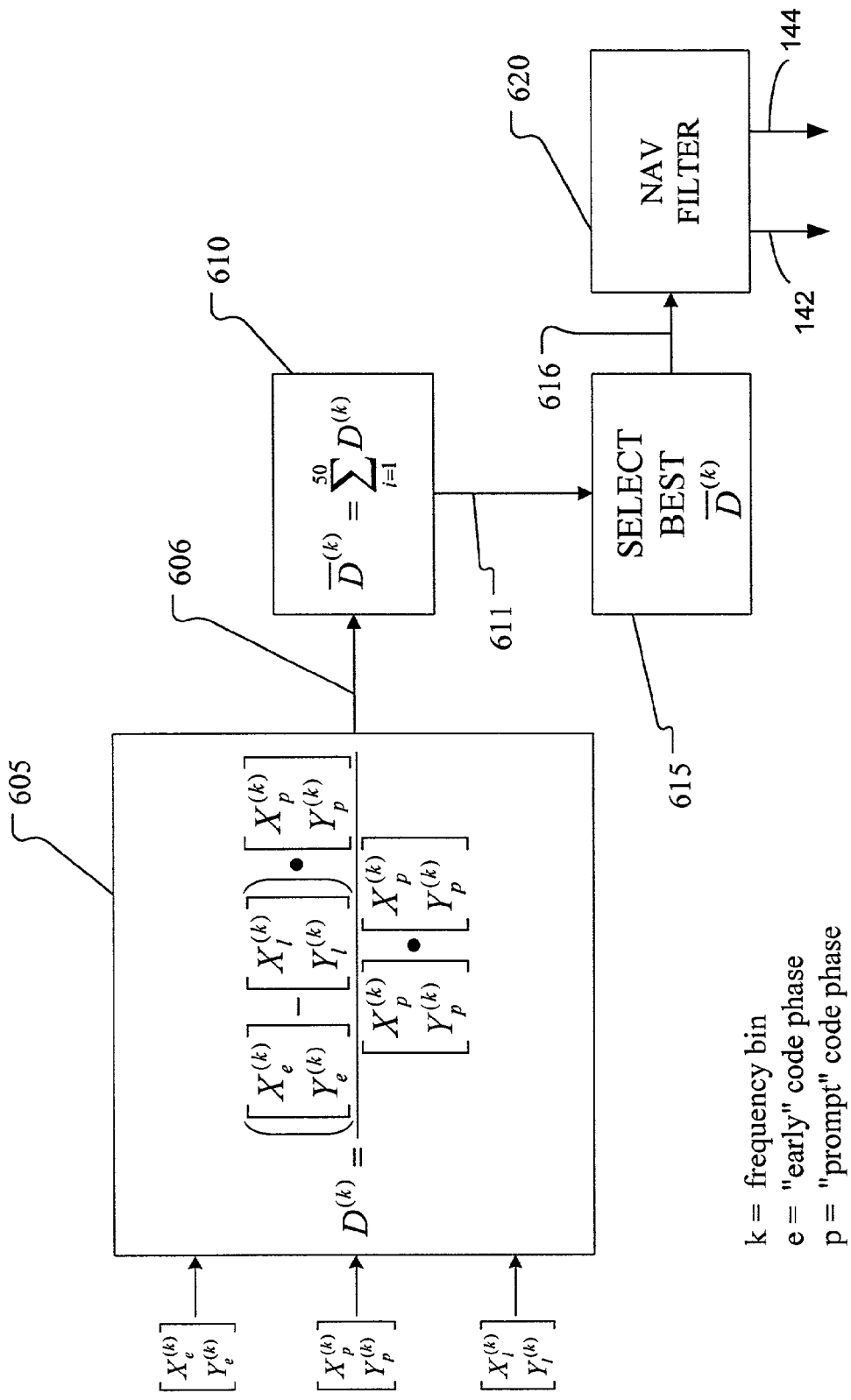
FIG. 6 is a block diagram illustrating a delay detector which can be used to determine a phase error, between the GPS receiver's local version of the code and the code of the received signal, using data from one of multiple frequency bins.

$\begin{bmatrix} X_e^{(k)} \\ Y_e^{(k)} \end{bmatrix} =$ vector of early versions of the in-phase composite value X (i.e., early version of $X(I) = X_e$) and the quadrature composite value Y (i.e., early version of $Y(q) = Y_e$) for the $k^{th}$ frequency bin;

$\begin{bmatrix} X_l^{(k)} \\ Y_l^{(k)} \end{bmatrix} =$ vector of late versions of the in-phase composite value X and the quadrature composite value Y for the $k^{th}$ frequency bin; and $\begin{bmatrix} X_p^{(k)} \\ Y_p^{(k)} \end{bmatrix} =$ vector of prompt versions of the in-phase composite value X and the quadrature value Y for the $k^{th}$ frequency bin As shown in FIG. 6, processing block 605 implements the delay detector function represented in Equation 1 and provides delay detector outputs $D^{(k)}$ at output 606. At summation block 610, a number (in this example 50) of delay detector outputs $D^{(k)}$ are summed together to generate a composite delay detector output 611. At processing block 615 estimation theory signal processing is utilize to select a correct frequency bin. For this $k^{th}$ frequency bin, the maximum delay is determined and provided at output 616. The data provided at 616 is indicative of how far the local version of the code is off from the satellite version of the code (i.e., of the pseudorange error) for use by navigation filter 620.

Navigation filter 620, which can be implemented as code feedback circuitry 240 and carrier feedback circuitry 245 shown in FIG. 2, receives the data provided at output 616 and generates several outputs. First, navigation filter 620 generates code feedback signal 142, which typically includes a local version of the GPS code for use in earlier signal processing functions shown in FIG. 1. Navigation filter 620 may also use the delay data available at output 616 to improve carrier feedback 144, which typically includes a local version of carrier for use in the earlier described signal processing functions shown in FIG. 1. Navigation filter 620 can also provide additional outputs (not shown) which can be used in navigation solution determination.

Figure 7:
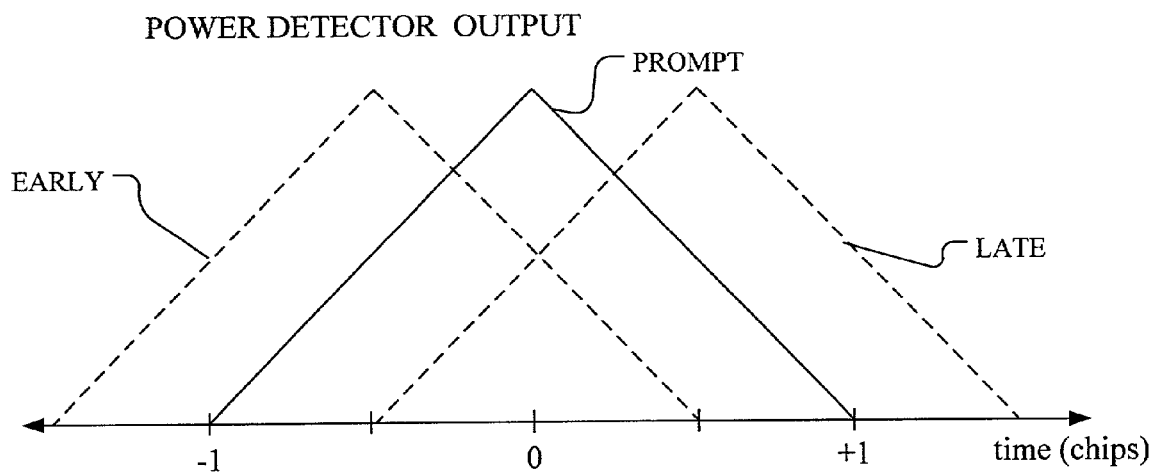
FIG. 7 is a diagrammatic illustration representative of a power detector output for one of the frequency bins at early, prompt and late taps.

FIG. 7 is a diagrammatic illustration of power detected using the early, prompt and late taps (to obtain time shifted versions of the GPS signal and therefor of the resulting composite in-phase and quadrature values X and Y) which demonstrate the manner in which the delay detector determines the degree to which the phase of the local code is offset from the phase of the incoming signal code. When the local code chip (the length of one code sequence) is perfectly aligned with the incoming code chip, the prompt version of the power detector output will have the most power. If the local version of the code is ahead of the code of the incoming signal, the late version of the signal will have the most power. If the local code is behind the code of the incoming signal, the early version of the signal will have the most power. Using this information, code feedback circuitry 240 can adjust the local version of the code provided at output 142 accordingly.

To summarize, in one embodiment, the power detection circuitry computes power after every PDI (for example every 20 milliseconds). Then, if power is detected the data is utilized in a delay detector algorithm (such is shown in Eq. 1) and used to correct any frequency errors by adjusting local versions of the code and carrier.

Referring back to FIG. 2, carrier tracking processing circuitry 220 utilizes the multiple in-phase and quadrature component measurements provided at output 250 to produce at output 221 an in-phase value $X_p^{(0)}$ and a quadrature value $Y_p^{(0)}$ for the prompt version of the K=0 frequency bin. Circuitry 220 can make this calculation using the same or similar relationship(s) used by circuitry 215. Power detection and data bit determining circuitry 235 can then implement power detection functions, such as the ones implemented by circuitry 230, to identify the power in the incoming signal. Then, circuitry 235 and carrier feedback circuitry 245 implement the delta carrier phase computation function and the data bit detector function illustrated in FIGS. 8 and 9.

Figure 8:
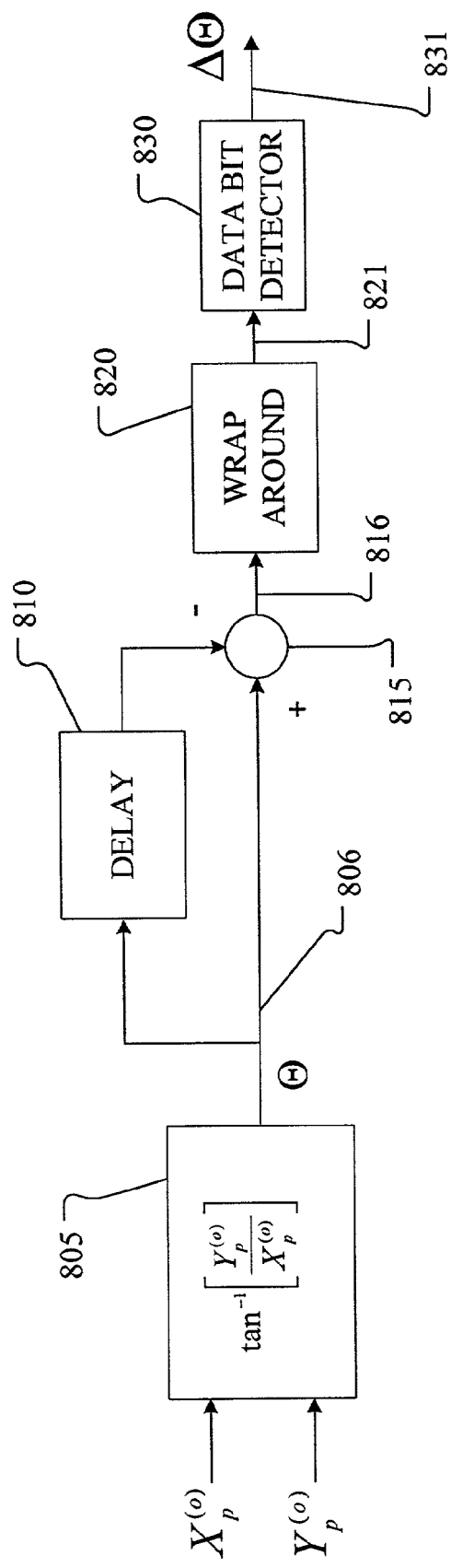
FIG. 8 is a block diagram illustrating a delta carrier phase computation algorithm which can be implemented in accordance with the present invention.

FIG. 8 is a block diagram illustrating a delta carrier phase computation which can be implemented by circuitry 235 (FIG. 2) in accordance with the present invention. As illustrated in FIG. 8, the prompt version of the in-phase and quadrature composite signals $X_p^{(0)}$ and $Y_p^{(0)}$ are fed into arctangent block 805, and the arctangent $\Theta$ of $Y_p^{(0)}/X_p^{(0)}$ is generated at output 806. Delay block 810 provides at output 811 a version of arctangent $\Theta$ which is delayed by 20 msec. At subtraction node 815, a prior or delayed version of arctangent $\Theta$ is subtracted from the current arctangent $\Theta$, with the output provided at 816. If the $\Delta\Theta$ provided at output 816 is greater than ±180°, then wrap around function 820 subtracts/adds 180 degrees from/to $\Delta\Theta$ in order to provide a version of $\Delta\Theta$ at output 821 which is bounded between ±180°. Data bit detector 830 receives output 821, determines whether a data bit has been detected, and provides an appropriately adjusted version of $\Delta\Theta$ at output 831. The determined carrier phase delay $\Delta\Theta$ provided at output 831 can then be used by carrier feedback circuitry 245 to compensate the local version of the carrier provided at output 144 (FIG. 2).

Figure 9:
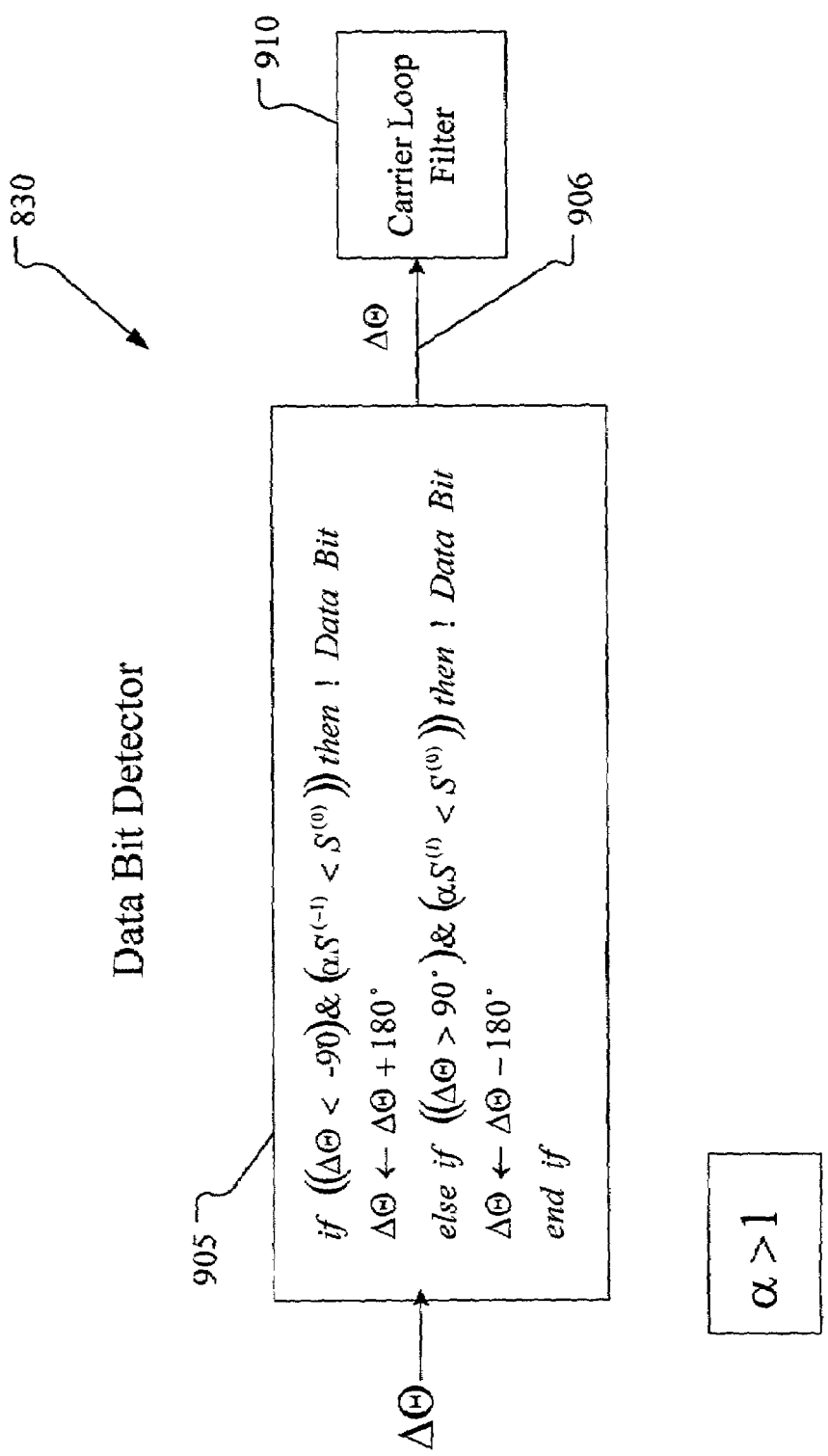
FIG. 9 is a block diagram illustrating a data bit detector which can be implemented in accordance with the present invention.

FIG. 9 is a block diagram of a data bit detector 830 which can be used in circuitry 235 (FIG. 2) to adjust the determined phase delay $\Delta\Theta$ (821 in FIG. 8) for the occurrence of a data bit. The function of the enhanced data bit detector is to ensure that if the determined phase delay $\Delta\Theta$ is large, it is large due to the occurrence of a data bit as opposed to a frequency error. In the data bit detector function, the determined phase delay $\Delta\Theta$ is fed into a computation block 905. In block 905, if $\Delta\Theta$ is less than −90° and if the power $S^{(-1)}$ for the k=−1 frequency bin (multiplied by a tunable parameter a having a value greater than one) is less than the power $S(0)$ for the k=0 frequency bin, then it is determined that the frequency error is due in part to the occurrence of a data bit. In this instance, phase delay $\Delta\Theta$ is increased by 180°, and the data bit adjusted phase delay is provided at output 906 to carrier loop filter 910 (for example filter 620 shown in FIG. 6) for use in providing carrier feedback 144 (FIG. 1). Similarly, if $\Delta\Theta$ is greater than +90° and if the power $S^{(1)}$ for the k=+1 frequency bin (multiplied by a tunable parameter $\alpha$ having a value greater than one) is less than the power $S^{(0)}$ for the k=0 frequency bin, then it is also determined that the frequency error is due in part to the occurrence of a data bit. In this instance, phase delay $\Delta\Theta$ is decreased by 180°, and the data bit adjusted phase delay is provided at output 906 to carrier loop filter 910 for use in providing carrier feedback 144 (FIG. 1). If neither of these conditions occur, then the phase delay $\Delta\Theta$ is determined to be a result of frequency error, and not a consequence of the receipt of a data bit. In this instance, the non-adjusted phase delay $\Delta\Theta$ is provided to filter 910 for use in providing the carrier feedback.

Although the present invention has been described with reference to illustrative embodiments, workers skilled in the art will recognize that changes may be made in form and detail without departing from the spirit and scope of the invention.

What is claimed is:

1. A method of enhancing signal tracking in a global positioning system receiver utilizing a multiple segment multiple frequency banked filter, the method comprising:
   acquiring a continuous time global positioning signal;
   separating the continuous time global positioning signal into in-phase and quadrature signals I and Q;
   sampling the signals I and Q over a predetection interval (PDI) to provide discrete time signals;
   generating from the discrete time signals a component in-phase measurement and a component quadrature measurement for each of a plurality of PDI segments of one PDI;
   for each of a plurality of different frequency bins, generating composite in-phase measurement by combining component in-phase measurements and component quadrature measurements from the PDI, and a composite quadrature measurement by combining component in-phase measurements and component quadrature measurements from the PDI;

detecting power in each of the plurality of different frequency bins for the PDI using the corresponding composite in-phase measurement and the corresponding composite quadrature measurement generated for the frequency bin; and determining which one of the plurality of different frequency bins contains the highest detected power.

2. The method of enhancing signal tracking of claim 1, wherein the step of sampling the signals I and Q over the PDI further comprises sampling the signals I and Q over a PDI of approximately 20 milliseconds to provide discrete time signals.

3. The method of enhancing signal tracking of claim 1, wherein a PDI is divided into five consecutive PDI segments and wherein the component in-phase measurements for each of the five PDI segments are $I_1, I_2, I_3, I_4$ and $I_5$, respectively, and wherein the component quadrature measurements for each of the five PDI segments are $Q_1, Q_2, Q_3, Q_4$ and $Q_5$, respectively.

4. The method of claim 3, wherein generating the composite in-phase measurements for each of five frequency bins includes:

generating for a first frequency bin a composite in-phase measurement using the relationship $I_1-Q_2-I_3+Q_4+I_5$ and generating for the first frequency bin a composite quadrature measurement using the relationship $Q_1+I_2-Q_3-I_4+Q_5$;

generating for a second frequency bin a composite in-phase measurement using the relationship $I_1+I_2-Q_3-Q_4-I_5$ and generating for the second frequency bin a composite quadrature measurement using the relationship $Q_1+Q_2+I_3+I_4-Q_5$;

generating for a third frequency bin a composite in-phase measurement using the relationship $I_1+I_2+I_3+I_4+I_5$ and generating for the third frequency bin a composite quadrature measurement using the relationship $Q_1+Q_2+Q_3+Q_4+Q_5$;

generating for a fourth frequency bin a composite in-phase measurement using the relationship $I_1+I_2+Q_3+Q_4-I_5$ and generating for the fourth frequency bin a composite quadrature measurement using the relationship $Q_1+Q_2-I_3-I_4-Q_5$; and generating for a fifth frequency bin a composite in-phase measurement using the relationship $I_1+Q_2-I_3-Q_4+I_5$ and generating for the fifth frequency bin a composite quadrature measurement using the relationship $Q_1-I_2-Q_3+I_4+Q_5$.

5. The method of claim 1, and further comprising applying a delay detector function to the composite in-phase measurement and the composite quadrature measurement for the frequency bin containing the highest detected power to obtain a delay detector output.

6. The method of claim 5, wherein the step of applying the delay detector function further comprises determining a delay $D^{(k)}$ for a selected frequency bin using the relationship:

$$D^{(k)} \sim \frac{\left( \begin{bmatrix} X_e^{(k)} \\ Y_e^{(k)} \end{bmatrix} - \begin{bmatrix} X_l^{(k)} \\ Y_l^{(k)} \end{bmatrix} \right) \cdot \begin{bmatrix} X_p^{(k)} \\ Y_p^{(k)} \end{bmatrix}}{\begin{bmatrix} X_p^{(k)} \\ Y_p^{(k)} \end{bmatrix} \cdot \begin{bmatrix} X_p^{(k)} \\ Y_p^{(k)} \end{bmatrix}} \text{ where}$$

$\begin{bmatrix} X_e^{(k)} \\ Y_e^{(k)} \end{bmatrix}$ = early versions of the in-phase composite value ($X$) and the quadrature composite value ($Y$) for the $k^{th}$ frequency bin;

$\begin{bmatrix} X_l^{(k)} \\ Y_l^{(k)} \end{bmatrix}$ = late versions of the in-phase composite value $X$ and the quadrature composite value $Y$ for the $k^{th}$ frequency bin; and $\begin{bmatrix} X_p^{(k)} \\ Y_p^{(k)} \end{bmatrix}$ = prompt versions of the in-phase composite value $X$ and the quadrature value $Y$ for the $k^{th}$ frequency bin.

7. The method of claim 5, and further comprising:

providing a feedback output as a function of the delay detector output; and performing the step of separating the continuous time global positioning signal into the in-phase and quadrature signals I and Q as a function of the feedback output.

8. The method of claim 1, and further comprising:

generating for the PDI prompt versions of a composite in-phase measurement $X_p^{(O)}$ and a quadrature in-phase measurement $Y_p^{(O)}$ corresponding to a frequency bin having an estimated carrier frequency error of approximately zero;

determining an arctangent of $Y_p^{(O)}/X_p^{(O)}$ to obtain a current carrier phase $\Theta$;

subtracting a delayed version of the carrier phase $\Theta$ from the current carrier phase $\Theta$ to obtain a value $\Delta\Theta$;

providing a carrier feedback output as a function of the value $\Delta\Theta$; and performing the step of separating the continuous time global positioning signal into the in-phase and quadrature signals I and Q as a function of the carrier feedback output.

9. The method of claim 8, and prior to providing the carrier feedback output as a function of the value $\Delta\Theta$, further comprising:

determining whether the value $\Delta\Theta$ is bounded between ±180°; and adjusting the value $\Delta\Theta$ if it is not bounded between ±180° by subtracting 180° from the value $\Delta\Theta$ if the value $\Delta\Theta$ is greater than 180°, and by adding 180° from the value $\Delta\Theta$ if the value $\Delta\Theta$ is less than −180° to obtain a wrap around adjusted value $\Delta\Theta$.

10. The method of claim 9, and further comprising:

determining whether a data bit has been received; and if a data bit has been received, then further adjusting the wrap around adjusted value $\Delta\Theta$ to provide a data bit adjusted value $\Delta\Theta$ which is more closely representative of frequency error.

11. A global positioning system receiver having enhanced signal tracking after signal acquisition, the global positioning system receiver comprising:

signal separation circuitry configured to separate an acquired continuous time global positioning signal into in-phase and quadrature signals I and Q;

signal processing circuitry coupled to the signal separation circuitry and configured to sample the signals I and Q over a predetection interval (PDI) to provide discrete time signals and to generate from the discrete time signals a component in-phase measurement and a component quadrature measurement for each of a plurality of PDI segments of one PDI;

tracking circuitry coupled to the signal processing circuitry and configured to generate, for each of a plurality of different frequency bins and for a time corresponding to the PDI, a composite in-phase measurement and a composite quadrature measurement by combining component in-phase measurements and component quadrature measurements from the PDI; and power detecting circuitry configured to detect power in each of the plurality of different frequency bins for the PDI using the corresponding composite in-phase measurement and the corresponding composite quadrature measurement generated for the frequency bin, wherein the power detection circuitry is configured to determine which one of the plurality of different frequency bins contains the highest detected power.

12. The global positioning system receiver of claim 11, wherein the signal processing circuitry is configured to sample the signals I and Q over a PDI of approximately 20 milliseconds to provide the discrete time signals.

13. The global positioning system receiver of claim 12, wherein a PDI is divided into five consecutive PDI segments and wherein the component in-phase measurements for each of the five PDI segments are $I_1$, $I_2$, $I_3$, $I_4$ and $I_5$, respectively, and wherein the component quadrature measurements for each of the five PDI segments are $Q_1$, $Q_2$, $Q_3$, $Q_4$ and $Q_5$, respectively.

14. The global positioning system receiver of claim 13, wherein the tracking circuitry is configured to generate the composite in-phase measurement and the composite quadrature measurement for each of five frequency bins by performing the steps of:

generating for a first frequency bin a composite in-phase measurement using the relationship $I_1-Q_2-I_3+Q_4+I_5$ and generating for the first frequency bin a composite quadrature measurement using the relationship $Q_1+I_2-Q_3-I_4+Q_5$;

generating for a second frequency bin a composite in-phase measurement using the relationship $I_1+I_2-Q_3-Q_4-I_5$ and generating for the second frequency bin a composite quadrature measurement using the relationship $Q_1+Q_2+I_3+I_4-Q_5$;

generating for a third frequency bin a composite in-phase measurement using the relationship $I_1+I_2+I_3+I_4+I_5$ and generating for the third frequency bin a composite quadrature measurement using the relationship $Q_1+Q_2+Q_3+Q_4+Q_5$;

generating for a fourth frequency bin a composite in-phase measurement using the relationship $I_1+I_2+Q_3+Q_4-I_5$ and generating for the fourth frequency bin a composite quadrature measurement using the relationship $Q_1+Q_2-I_3-I_4-Q_5$; and generating for a fifth frequency bin a composite in-phase measurement using the relationship $I_1+Q_2-I_3-Q_4+I_5$ and generating for the fifth frequency bin a composite quadrature measurement using the relationship $Q_1-I_2-Q_3+I_4+Q_5$.

15. The global positioning system receiver of claim 11, and further comprising a delay detector configured to apply a delay determining function to the composite in-phase measurement and the composite quadrature measurement for the frequency bin containing the highest detected power to obtain a delay detector output.

16. The global positioning system receiver of claim 15, and further comprising feedback circuitry coupled to the delay detector and configured to provide a feedback output as a function of the delay detector output, wherein the signal separation circuitry is configured to separate the acquired continuous time global positioning signal into the in-phase and quadrature signals I and Q as a function of the feedback output.

17. The global positioning system receiver of claim 11, wherein the tracking circuitry is further adapted to generate for the PDI prompt versions of a composite in-phase measurement $X_p^{(0)}$ and a quadrature in-phase measurement $Y_p^{(0)}$ corresponding to a frequency bin having an estimated carrier frequency error of approximately zero, the receiver further comprising:

carrier phase computation circuitry configured to determine an arctangent of $Y_p^{(0)}/X_p^{(0)}$ to obtain a current carrier phase $\Theta$, and to subtract a delayed version of the carrier phase $\Theta$ from the current carrier phase $\Theta$ to obtain a value $\Delta\Theta$, the carrier phase computation circuitry adjusting the value $\Delta\Theta$ if a data bit has occurred; and carrier feedback circuitry coupled to the carrier phase computation circuitry and configured to provide a carrier feedback output as a function of the value $\Delta\Theta$, wherein the signal separation circuitry is further configured to separate the continuous time global positioning signal into the in-phase and quadrature signals I and Q as a function of the value $\Delta\Theta$.

18. A method of enhancing signal tracking in a global positioning system receiver utilizing a multiple segment multiple frequency banked filter, the method comprising:

acquiring a continuous time global positioning signal;

separating the continuous time global positioning signal into in-phase and quadrature signals I and Q;

sampling the signals I and Q over a predetection interval (PDI) to provide discrete time signals;

generating from the discrete time signals a component in-phase measurement and a component quadrature measurement for each of a plurality of PDI segments of one PDI;

for each of a plurality of different frequency bins, generating a composite in-phase measurement by combining component in-phase measurements and component quadrature measurements from the PDI, and generating a composite quadrature measurement by combining component in-phase measurements and component quadrature measurements from the PDI;

generating for the PDI prompt versions of a composite in-phase measurement $X_p^{(0)}$ and a quadrature in-phase measurement $Y_p^{(0)}$ corresponding to a frequency bin having an estimated carrier frequency error of approximately zero;

determining an arctangent of $Y_p^{(0)}/X_p^{(0)}$ to obtain a current carrier phase $\Theta$;

subtracting a delayed version of the carrier phase $\Theta$ from the current carrier phase $\Theta$ to obtain a value $\Delta\Theta$;

providing a carrier feedback output as a function of the value $\Delta\Theta$;

performing the step of separating the continuous time global positioning signal into the in-phase and quadrature signals I and Q as a function of the carrier feedback output; and detecting power in each of the plurality of different frequency bins for the PDI using the corresponding composite in-phase measurement and the corresponding composite quadrature measurement generated for the frequency bin.

19. The method of enhancing signal tracking of claim 18, wherein the step of sampling the signals I and Q over the PDI further comprises sampling the signals I and Q over a PDI of approximately 20 milliseconds to provide discrete time signals.

20. The method of enhancing signal tracking of claim 18, wherein a PDI is divided into five consecutive PDI segments and wherein the component in-phase measurements for each of the five PDI segments are $I_1$, $I_2$, $I_3$, $I_4$ and $I_5$, respectively, and wherein the component quadrature measurements for each of the five PDI segments are $Q_1$, $Q_2$, $Q_3$, $Q_4$ and $Q_5$, respectively.

* * * * *